US009003531B2

(12) United States Patent
Nazarov

(10) Patent No.: US 9,003,531 B2
(45) Date of Patent: Apr. 7, 2015

(54) COMPREHENSIVE PASSWORD MANAGEMENT ARRANGMENT FACILITATING SECURITY

(75) Inventor: Denis Nazarov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 1009 days.

(21) Appl. No.: 12/698,694

(22) Filed: Feb. 2, 2010

(65) Prior Publication Data

US 2011/0083181 A1    Apr. 7, 2011

(30) Foreign Application Priority Data

Oct. 1, 2009   (RU) .................................. 2009136232

(51) Int. Cl.
    *G08B 23/00*    (2006.01)
    *G06F 21/56*    (2013.01)
    *H04L 29/06*    (2006.01)

(52) U.S. Cl.
    CPC .............. *G06F 21/562* (2013.01); *H04L 63/14* (2013.01); *H04L 63/308* (2013.01)

(58) Field of Classification Search
    CPC ................. G06F 21/00; G06F 21/50; G06F 21/56–21/565; G06F 2221/2107; G06F 2221/2125; H04L 9/00; H04L 9/006; H04L 9/08; H04L 9/0894; H04L 2209/76; H04L 63/04; H04L 63/0428–63/0492; H04L 63/06; H04L 63/062; H04L 63/14–63/1416; H04L 63/1441–63/145; H04L 63/168; H04L 63/30–63/308; H04L 67/2842
    USPC .......... 726/1–5, 22–24, 26–27; 713/153, 173, 713/187–188; 380/1
See application file for complete search history.

(56) References Cited

U.S. PATENT DOCUMENTS

| 5,216,725 A | 6/1993 | McCubbrey |
|---|---|---|
| 5,321,770 A | 6/1994 | Huttenlocher et al. |

(Continued)

FOREIGN PATENT DOCUMENTS

| EP | 0 621 554 A2 | 10/1994 |
|---|---|---|
| EP | 1 357 508 A2 | 10/2003 |

(Continued)

OTHER PUBLICATIONS

Identity Finder Home Edition, Version 4.7, Jan. 6, 2011.

(Continued)

*Primary Examiner* — Saleh Najjar
*Assistant Examiner* — Eric W Shepperd
(74) *Attorney, Agent, or Firm* — Patterson Thuente Pedersen, P.A.

(57) ABSTRACT

Computer-implemented process and apparatus for screening data for malware. Received data stored in at least one data store includes at least: (i) a first protected item of data containing contents that are generally inaccessible without specific access credential information, and (ii) specific access credential information corresponding to the first protected item of data. The received data is analyzed to detect any protected items of data therein based on predetermined protected data item identification criteria and to detect any access credential information contained therein based on predetermined access credential identification criteria. In response to a detection of the specific access credential information in the at least one data store, the specific access credential information is stored in the at least one data store in a grouping arrangement with other access credential information. In response to a detection of the first protected item of data, use the specific access credential information is stored in the grouping arrangement to facilitate access to the first protected item of data by a malware screening process to extract its content. The malware screening process is executed to scan the content extracted from the first protected data item to detect a presence of malware.

24 Claims, 10 Drawing Sheets

(56) References Cited

U.S. PATENT DOCUMENTS

| | | | |
|---|---|---|---|
| 5,369,714 A | 11/1994 | Withgott et al. | |
| 5,390,259 A | 2/1995 | Withgott et al. | |
| 5,410,611 A | 4/1995 | Huttenlocher et al. | |
| 5,438,630 A | 8/1995 | Chen et al. | |
| 5,455,871 A | 10/1995 | Bloomberg et al. | |
| 5,485,566 A | 1/1996 | Rahgozar | |
| 5,491,760 A | 2/1996 | Withgott et al. | |
| 5,539,841 A | 7/1996 | Huttenlocher et al. | |
| 5,592,568 A | 1/1997 | Wilcox et al. | |
| 5,606,614 A | 2/1997 | Brady et al. | |
| 5,848,191 A | 12/1998 | Chen et al. | |
| 6,411,943 B1 | 6/2002 | Crawford | |
| 6,470,094 B1 | 10/2002 | Lienhart et al. | |
| 6,577,755 B1 | 6/2003 | Lorie | |
| 6,608,930 B1 | 8/2003 | Agnihotri et al. | |
| 6,751,670 B1* | 6/2004 | Patterson | 709/229 |
| 6,895,436 B1 | 5/2005 | Caillau et al. | |
| 6,981,138 B2* | 12/2005 | Douceur et al. | 713/153 |
| 7,120,800 B2 | 10/2006 | Ginter et al. | |
| 7,171,046 B2 | 1/2007 | Myers et al. | |
| 7,188,086 B2 | 3/2007 | Shinzaki et al. | |
| 7,305,612 B2 | 12/2007 | Chakraborty | |
| 7,328,454 B2 | 2/2008 | Strickland et al. | |
| 7,400,768 B1 | 7/2008 | Mayzlin | |
| 7,401,356 B2 | 7/2008 | Bandini et al. | |
| 7,448,085 B1 | 11/2008 | Reyes et al. | |
| 7,454,063 B1 | 11/2008 | Kneisl et al. | |
| 7,480,941 B1 | 1/2009 | Balasubramaniam et al. | |
| 7,711,192 B1 | 5/2010 | Smirnov | |
| 7,730,540 B1* | 6/2010 | Woirhaye et al. | 726/26 |
| 2004/0221062 A1 | 11/2004 | Starbuck et al. | |
| 2005/0066165 A1 | 3/2005 | Peled et al. | |
| 2005/0204020 A1* | 9/2005 | O'Brien et al. | 709/219 |
| 2005/0216564 A1 | 9/2005 | Myers et al. | |
| 2005/0268345 A1 | 12/2005 | Harrison et al. | |
| 2005/0281455 A1 | 12/2005 | Huang | |
| 2006/0215230 A1 | 9/2006 | Borrey et al. | |
| 2007/0016804 A1 | 1/2007 | Kemshall | |
| 2007/0027749 A1 | 2/2007 | Peiro et al. | |
| 2007/0089166 A1* | 4/2007 | Medjitov | 726/5 |
| 2008/0219495 A1 | 9/2008 | Hulten et al. | |
| 2008/0320592 A1* | 12/2008 | Suit et al. | 726/23 |
| 2009/0097662 A1* | 4/2009 | Olechowski et al. | 380/286 |
| 2009/0210943 A1* | 8/2009 | Alon et al. | 726/24 |
| 2009/0282485 A1* | 11/2009 | Bennett | 726/24 |
| 2010/0071064 A1* | 3/2010 | Weber | 726/24 |
| 2010/0107249 A1* | 4/2010 | Krig | 726/22 |
| 2011/0167275 A1* | 7/2011 | Niemela | 713/188 |

FOREIGN PATENT DOCUMENTS

| | | |
|---|---|---|
| WO | WO 2005/084177 A2 | 9/2005 |
| WO | WO 2006/110669 A2 | 10/2006 |

OTHER PUBLICATIONS

ActMon PWL Password Finder (WASP), Version 2.03, Dec. 23, 2004.
ZIP Key, Version 6.5, Jul. 26, 2004.
Passware Kit Enterprise, Version 10.5.3294, Jun. 1, 2011.
Advanced RAR Password Recovery, Version 1.52, Apr. 4, 2005.
Captcha Wikipedia Article, Last Modified Jul. 14, 2011.

* cited by examiner

```
{-} Directory1
 ├── Archive1.rar
 ├── Archive2.rar
 ├── Archive3.rar
 └── Password.txt
```

FIG. 6A

E-mail body

Hi,

The password to the attachment file is  A2BDS35K

FIG. 6B

COMPREHENSIVE PASSWORD MANAGEMENT ARRANGMENT FACILITATING SECURITY

FOREIGN PRIORITY

This application claims priority to Russian Federation patent application No. 2009136232, filed Oct. 1, 2009, and entitled "System for Management of Passwords for Encrypted Files and Archives."

FIELD OF THE INVENTION

The invention relates generally to computing and information processing. More specifically, this invention relates to systems and methods for the accelerated detection of malware in compressed data structures utilizing advanced local and remote access management.

BACKGROUND OF THE INVENTION

Destructive computer programs much as viruses, spyware, malware and others have become a mainstay in the computing world. What began in the 1970's with the creation of somewhat primitive programs that harmed specific machines has evolved into highly complex programs capable of spreading and proliferating over networks of attached computers. Along with the evolution of malware and harmful programs, the programs used to protect systems against these harmful programs have developed as well. Programs that began by utilizing simple filename comparisons or file size comparisons have evolved to utilize additional technologies to increase performance and coverage such as similarity determinations or utilizing hashing or other encryption.

Several companies, including Kaspersky, Symantec, McAfee, Panda, Eset and others offer programs aimed at providing solutions to provide protection against the harmful programs. These programs utilize various methods of protection, many of which focus on the comparison of received files with signatures stored in a local or centralized database. For example, an email attachment received by a user will be investigated and the attachment name, size and extension will be captured and compared against a local database of known harmful files. If a match is found in the known database, the user will be notified that the file is harmful and given options to terminate or continue in the user action. Additionally, select programs are able to examine data stored within unprotected archives that have been compressed.

However, existing programs are inefficient in processing attachments. Current attachment analysis programs utilize a specific set of metadata such as size, name, extension and in some cases, date, for comparisons. Various file compression programs exist and are able to compress data into transportable archives. Programs marketed using trademarks such as Gzip, Zip, 7zip, WinRar and others provide user interfaces and command line options of implementing the compression. This compression reduces file sizes and thus reduces the bandwidth required to transfer information. In addition, the archive formats effectively "hide" or "obfuscate" the contents of the archive, so that the contents are not directly discernible without first decompressing the archive. Many of these compression programs allow the archive creator to apply various access credential technologies to the archives. For example, an information supplier may create a compressed archive of a computer executable program and apply a password to the generated archive file so as to prevent unauthorized access. Typically, a protected archive will have its contents encrypted so that a key would be needed to gain access to those contents. While these features are certainly useful for protecting data from being accessible to persons other than the intended recipient, they can also be exploited as tools to defeat security measures. For instance, a malicious program can be encrypted and transmitted to a target computer. In this form, the malicious program is virtually undetectable until decompression, and is encoded based on the encryption key. Accordingly, the same malicious program can be copied a multiplicity of times with each copy being encoded with a different key, thereby appearing different from all of the other copies.

Current anti-virus and other protection technology cannot examine the contents of protected archives and thus, a protected archive containing malware or malicious code may pass the initial scan. The user may obtain the access credentials for the protected archive in a later transmission or other communication and attempt to access the information in protected archive and unwittingly execute malware or malicious code on their machine. While certain efforts have been made to reduce this occurrence, such as examining email addresses, and attachment sizes, the malware and malicious code creators have altered their practices to steer clear of these protections. For instance, the protected archive and access credential information may come from distinct email addresses, but maintain visual congruency in order to trick the user into opening the protected archive.

While some of the current security programs are able to extract data from unprotected compressed archives and compare the archive content to the local or remote malware databases, none of the programs available today are able to extract data from protected archives within any practical amount of time as part of a malware scan or intrusion detection screen. Currently, when confronted with an archive requiring access credentials, security software will attempt to compare the name, size and extension of the archive, as a whole, to the files stored in the local or remote virus database. Since a known malware program can be so readily obfuscated into a multiplicity of forms, virus databases simply cannot keep up with the rate at which the copies of malware can be made and distributed.

As a practical matter, distributors of malware in compressed archives need to provide the access credentials along with the compressed archive itself, so that the compressed archive can be decrypted to be executed. Malware distributors will want to make the access credentials easily available to human users, but difficult to identify for security programs. For example, the access credential information for accessing the malicious program may be supplied in a separate transmission or in a separate format, making it extremely difficult to automatically match up the credentials to the compressed archive.

Moreover, challenge-response gate technology aimed at ensuring that an actual human is interacting with a service or feature, such as Captcha, can be used to confound security programs. This technology has been conventionally applied to inhibit "bots" or automated computing devices tasked with the proliferation of malware, spam or other harmful payloads. However, the same technology can be readily used to proliferate attacks by inhibiting the protection software.

Accordingly, a practical solution is needed to address these and other challenges of efficient and effective containment of malware.

SUMMARY OF THE INVENTION

Aspects of the invention are directed to improving the functionality of security applications to provide a practical approach for scanning protected data such as encrypted archives. In some embodiments, data is scanned for indicia of access credential information such as passwords, keys, personal identification numbers (PINs) and the like. Provisions exist for examining access credentials in the form of text, or disguised as a challenge response such as in an image. When found, the access credentials are collected and maintained in a grouping such as a list, file, or database, or simply indexed. The collection is then used to access the protected data, regardless of whether the protected data was received separately from the associated credentials. Advantageously, in some embodiments, the building of the collection can be utilized to provide other functionality, such as assisting the user with the management of access credential information in general. Related embodiments are directed to a comprehensive access credential management solution.

According to one type of embodiment, a computer-implemented process and apparatus are provided for screening data for malware. Received data stored in at least one data store includes at least: (i) a first protected item of data containing contents that are generally inaccessible without specific access credential information, and (ii) specific access credential information corresponding to the first protected item of data. The received data is analyzed to detect any protected items of data therein based on predetermined protected data item identification criteria and to detect any access credential information contained therein based on predetermined access credential identification criteria. In response to a detection of the specific access credential information in the at least one data store, the specific access credential information is stored in the at least one data store in a grouping arrangement with other access credential information. In response to a detection of the first protected item of data, use the specific access credential information is stored in the grouping arrangement to facilitate access to the first protected item of data by a malware screening process to extract its content. The malware screening process is executed to scan the content extracted from the first protected data item to detect a presence of malware.

In a related type of embodiment, the computer system is further configured to prevent direct user access to the contents of the first protected item of data until successful completion of the malware screening process. In another related type of embodiment, the access credential information stored in the grouping arrangement is grouped with user-generated access credential information for a variety of different programs or services in a secure arrangement of at least one data structure.

BRIEF DESCRIPTION OF THE DRAWINGS

The invention may be more completely understood in consideration of the following detailed description of various embodiments of the invention in connection with the accompanying drawings, in which:

FIG. 6A is a graphical depiction of a plurality of archives and associated access credential file according to one embodiment.

FIG. 6B is a graphical depiction of graphical access credential information according to one embodiment.

Figure 1:
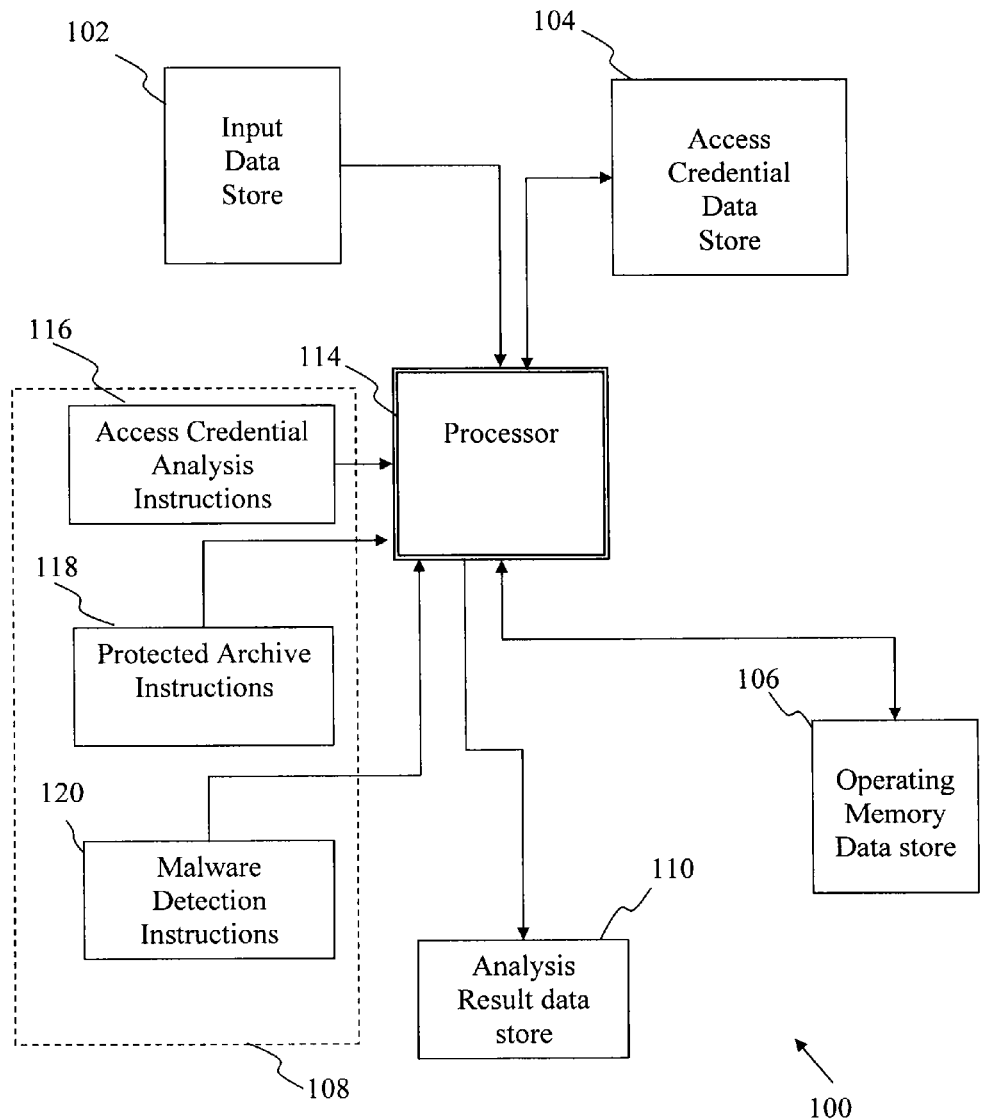
FIG. 1 is a block diagram illustrating a relatively high-level architecture of a computer system programmed to find, manage and apply access credential mechanisms according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 2:
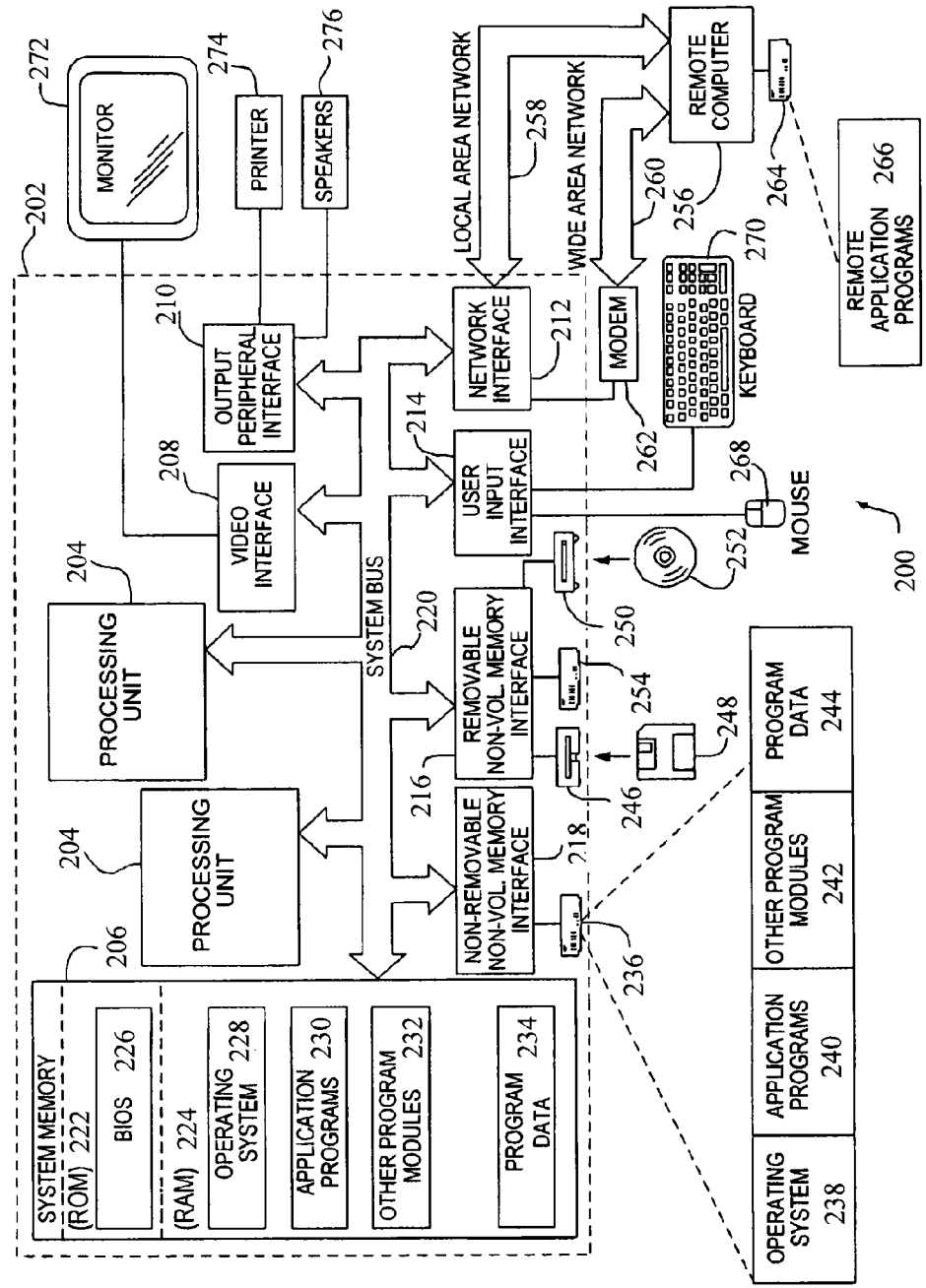
FIG. 2 is a diagram illustrating in greater detail a computer system on which aspects of the invention as described herein may be implemented according to various embodiments.

Referring to FIGS. 1-3, various computer-based embodiments of systems for access credential information management are described. FIG. 1 illustrates a relatively high-level architecture of a computer system programmed to manage access credential information according to one embodiment. The computer system 100 includes an input data store 102, an access credential data store 104, an operating memory data store 106, an instruction set data store 108, an analysis result data store 110 and a processor 114. Each of the data storage facilities can be allocated in one, or a combination of, RAM, magnetic or optical disk, flash, or any suitable medium for storing data. The system 100 includes processor 114 that is programmed to read input data store 102 (from which it obtains a target software item or items), and access credential data store 104, from which known access credential information is received. The processor 114 reads instructions from an instruction set data store 108. The instruction set data store 108 may contain the access credential analysis instruction 116, protected archive instructions 118 and malware detection instructions 120. At different operating steps the processor 114 reads operating instructions from instruction set data store 108, and processes data according to those instructions. The output from processor 114 execution of instructions is written to the analysis result data store 110. Further, during the execution of the instructions read form the instruction set data store 108, the processor may read and write data to the operating memory data store 106. In this way the operating memory data store is used to hold data that is manipulated and transformed during processing. Further, the operating memory data store 106 may contain the analysis result data before writing to the analysis result data store 110.

In one type of embodiment, the computer system is implemented in a single computer system. In another type of embodiment, however, the system may be implemented utilizing a system of more than one distinct computer, communicatively coupled with one another. Accordingly, in various embodiments, the input data store, access credential data store, instruction set data store, operating memory data store and analysis result data store utilize the same underlying hardware.

FIG. 2 is a diagram illustrating in greater detail a computer system 200 on which aspects of the invention as described herein may be implemented according to various embodiments. The computer system 200 may include a computing device such as a personal computer 202. The personal computer 202 includes one or more processing units 204, a system memory 206, a video interface 208, an output peripheral interface 210, a network interface 212, a user input interface 214, removable 216 and non-removable 218 memory interfaces and a system bus or high-speed communications channel 220 coupling the various components. In various embodiments, the processing units 204 may have multiple logical cores that are able to process information stored on computer readable media such as the system memory 206 or memory attached to the removable 216 and non-removable 218 memory interfaces 218. The computer 202 system memory 206 may include non-volatile memory such as Read Only Memory (ROM) 222 or volatile memory such as Random Access Memory (RAM) 224. The ROM 222 may include a basic input/output system (BIOS) 226 to help communicate with the other portion of the computer 202. The RAM 224 may store portions of various software applications such as the operating system 228, application programs 230 and other program modules 232. Further, the RAM 224 may store other information such as program or application data 234. In various embodiments, the RAM 224 stores information that requires low-latencies and efficient access, such as programs and data being manipulated or operated on. In various embodiments RAM 224 comprises Double Data Rate (DDR) memory, Error Correcting memory (ECC) or other memory technologies with varying latencies and configurations such as Rambus or DDR2 and DDR3. In this way, in various embodiments, the system memory 206 may store the input data store, access credential data store, operating memory data store, instruction set data store, analysis result data store and the operating memory data store. Further, in various embodiments, the processing units 204 may be configured to execute instructions that limit access to the aforementioned data stores by requiring access credential before access to the information is granted.

The removable 216 and non-removable 218 memory interfaces may couple the computer 202 to disk drives 236 such as a solid state drives (SSD) or rotational disk drives. These disk drives 236 may provide further storage for various software applications such as the operating system 238, application programs 240 and other program modules 242. Further, the disk drives 236 may store other information such as program or application data 244. In various embodiments, the disk drives 236 store information that doesn't require the same low-latencies as in other storage mediums. Further, the operating system 238, application program 240 data, program modules 242 and program or application data 244 may be the same information as that stored in the RAM 224 in various embodiments mentioned above or it may be different data potentially derivative of the RAM 224 stored data.

Further, the removable non-volatile memory interface 216 may couple the computer 202 to magnetic portable disk drives 246 that utilize magnetic media such as the floppy disk 248, Iomega® Zip or Jazz, or optical disk drives 250 that utilize optical media 252 for storage of computer readable media such as Blu-Ray®, DVD-R/RW, CD-R/RW and other similar formats. Still other embodiments utilize SSD or rotational disks housed in portable enclosures 254 to increase the capacity of removable memory.

The computer 202 may utilize the network interface 212 to communicate with one or more remote computers 256 over a local area network (LAN) 258 or a wide area network (WAN) 260. The network interface 212 may utilize a Network Interface Card (NIC) or other interface such as a modem 262 to enable communication. The modem 262 may enable communication over telephone lines, coaxial, fiber optic, or powerline. The remote computer 256 may contain a similar hardware and software configuration or may have a memory 264 that contains remote application programs 266 that may provide additional computer readable instructions to the computer 202. In various embodiments, the remote computer memory 264 can be utilized to store information such as identified file information that may be later downloaded to local system memory 206. Further, in various embodiments the remote computer 256 may be an application server, an administrative server, client computers, or a network appliance.

A user may enter information to the computer 202 using input devices connected to the user input interface 214 such as a mouse 268 and keyboard 270. Additionally, the input device may be a trackpad, fingerprint scanner, joystick, barcode scanner, media scanner or the like. The video interface 208 may provide visual information to a display such as a monitor 272. The video interface 208 may be an embedded interface or it may be a discrete interface. Further, the computer may utilize a plurality of video interfaces 208, network interfaces 212 and removable 216 and non-removable 218 interfaces in order to increase the flexibility in operation of the computer 202. Further, various embodiments utilize several monitors 272 and several video interfaces 208 to vary the performance and capabilities of the computer 202. Other computer interfaces may be included in computer 202 such as the output peripheral interface 210. This interface may be coupled to a printer 274 or speakers 276 or other peripherals to provide additional functionality to the computer 202.

Various alternative configurations and implementations of the computer 202 are within the spirit of the invention. These variations may include, without limitation, additional interfaces coupled to the system bus 220 such as universal serial bus (USB), printer port, game port, PCI, PCI-X PCI Express or integrations of the various components described above into chipset components such as the northbridge or southbridge. For example, in various embodiments, the processing unit 204 may include an embedded memory controller (not shown) to enable more efficient transfer of data from the system memory 206 than the system bus 220 may provide.

Figure 3A:
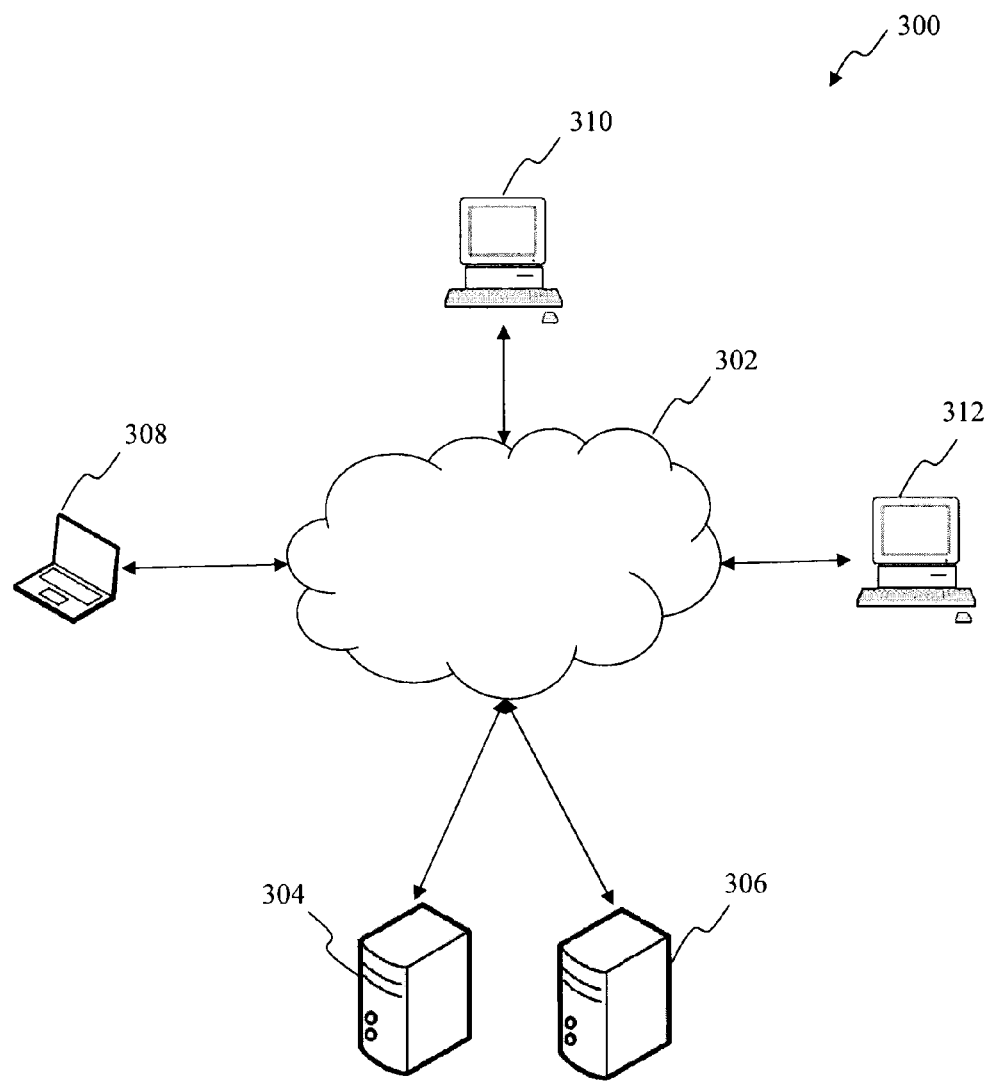
FIGS. 3A and 3B illustrate examples of network-implemented embodiments of carrying out the system of managing access credential according to some aspects of the invention.
Figure 3B:
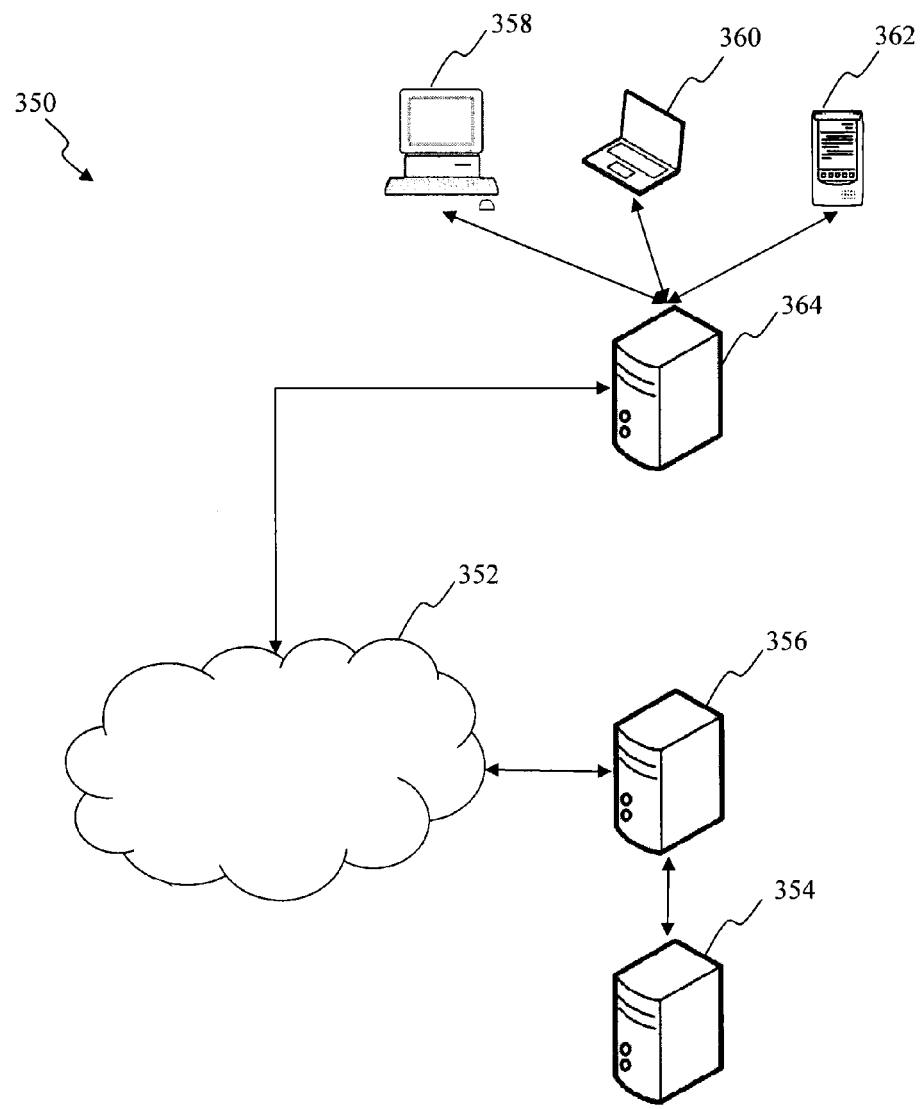

FIGS. 3A and 3B illustrate examples of a network-implemented embodiment an access credential information management system according to some aspects of the invention. Turning first to FIG. 3A, system 300 utilizes a computer network 302, which can be the Internet, an application server 304, an administrative server 306 and client computers 308, 310 and 312.

The computer network 302 is utilized to provide interconnectivity between the application server 304, administrative server 306 and client computers 308, 310 and 312. In this way, the system 300 utilizes the computer network 302 as a platform to connect otherwise disconnected computers and computer networks and allows network capable devices to send and receive information and connect to programs and services made available.

The application server 304 may include a database component and an application/web server component. In this embodiment, client computers 308, 310 and 312 may connect to application server 304 to obtain access credential and malicious code information. Further, the application servers 304 may utilize database software such as those marketed under the tradenames MySQL®, Microsoft® SQLServer®, Oracle®, PostgreSQL®, Ingres®, hash files or a combination thereof, to store access credential information and malware information. In other embodiments the application server 304 is connected via a distributed network utilizing various architectures such as Client-Server, N-Tier, peer-to-peer (P2P), cloud or cluster. Further, application server 304 may be a standard desktop computer or may utilize high-end server hardware. A person having skill in the art will appreciate that the application server 304 will utilize hardware that is most appropriate for its load and performance requirements whether that be a the mini-ITX form factor, Extended ATX (Advanced Technology eXtended), blade or other configuration. Further, the servers may utilize Intel or AMD, or other processors, Double Data Rate (DDR) memory, Error Correcting memory (ECC), rotational or Solid State Disk (SSD) arrays and other hardware to ensure optimum performance and reliability in operation and storing of data. Further, the application server 304 may utilize enterprise-class software such as Linux®, Unix® or Windows® Server operating systems. Additional application server 304 may be utilized in load-balancing or cluster configurations in order to handle increased load and to maintain system performance as the number of requests to the application server 304 increase. In other embodiments, the application server 304 instructions are stored in the memory of client computers 308, 310 and 312.

The administrative server 306 may be a server located at an external service provider or computer software provider. The administrative server 306 may validate client computer's 308, 310 and 312 license or other access credential information when attempts are made to retrieve access credential information relating to, for example, various local or network enabled services, received protected archive files, or access credential strength indicators. Further, the administrative server 304 may be configured to utilize hardware and software similar to the application server 302 above. In one embodiment, the administrative server 304 and the application server 304 may utilize the same hardware to which the client computers 308, 310 and 312 connect. In this way, the administrative server may operate to identify computers authorized to utilize the various embodiments disclosed herein.

Client computers 308, 310 and 312 may be personal desktop computers, personal laptops, netbooks, servers, ultra-mobile personal computers (UMPCs), smartphones such as the iPhone® from Apple® or Pre® from Palm® or other devices. In various embodiments, the client computers may utilize, Double Data Rate (DDR) memory, Error Correcting memory (ECC), rotational or Solid State Disks (SSD) to store the information relating to identified files. Client computers may utilize software such as Linux®, Unix® or Windows® or Apple® operating systems. Further, as disclosed above the client computers 308, 310 and 312 may utilize database software such as Microsoft Access, MySQL lite, SQL Server Express, IBM DBS Express, hash files or a combination thereof to store information relating to access credential information and malware in a structure allowing for fast retrieval.

Now referring to FIG. 3B another embodiment of a system 350 for access credential information management is presented. This embodiment includes computer network 352, application server 354, administrative server 356, client computers 358, 360 and 362 and network appliance 364. In this embodiment, client computers 358, 360 and 362 operate on a Local Area Network (LAN). Further, the LAN may utilize a firewall, router, server or other network appliance 364 to filter access to network resources. In this embodiment the application server 354 may be embedded into the firewall router, server or other network appliance 364. Thus, the client computers 358, 360 and 362 may request access credential information or malware information from the local network appliance 364. In other embodiments, communication with the application server 354 may be moderated by the administrative server 356. This access to access credential information and malware information stored in the application server 354 may first require access credential from the client computer 358, 360 and 362 to pass through the administrative server 356. In this way, unauthorized access to access credential and malware information can be secured.

In various embodiments, the client computers 358, 360 and 362 may be configured to run software applications developed in a variety of programming languages including JAVA®, .NET, C, C++, C#, Perl®, Ruby®, Grails®, Python® and others. Thus, the methods for access credential management and malware detection may be implemented at least partially in one of the said variety of programming languages and executed on client computers. In certain embodiments client computers 358, 360 and 362 utilize a TCP/IP link to connect to the application server 354 to obtain access credential management and malware information. In other embodiments, the client computers 358, 360 and 362 utilize a web service to obtain information. The web service may utilize TCP/IP including hypertext transfer protocol (HTTP) and implement Simple Object Access Protocol (SOAP), or may utilize a Representational State Transfer (REST)-ful architecture for queries and response. Further, the web service may be secured by utilizing secure web service technologies such as eXtensible Markup Language (XML) encryption, XML signatures, Secure Socket Layer (SSL), Transport Layer Security (TLS), Hypertext Transfer Protocol Secure (HTTPS) or HTTP authorization. In this embodiment, client computers 358, 360 and 362 format messages containing requested file information and send it to the application server 354 which processes the message and returns the requested information.

Importantly, it should be understood that it is immaterial to the spirit of the invention as to where, or in what manner, the access credential management software items including access credentials, protected archive and malware detection software items and associated access credential data, input data and analysis result data are stored or maintained. In various embodiments, software items may constitute files stored in the computer system's file system, or may be sets of data stored as part of one or more files, or loaded into RAM, a data buffer, or any other practical medium, whether local to the computer system, or located remotely, that is accessible to the processor of the computer system performing the access credential analysis, protected archive analysis or malware detection.

Figure 4:
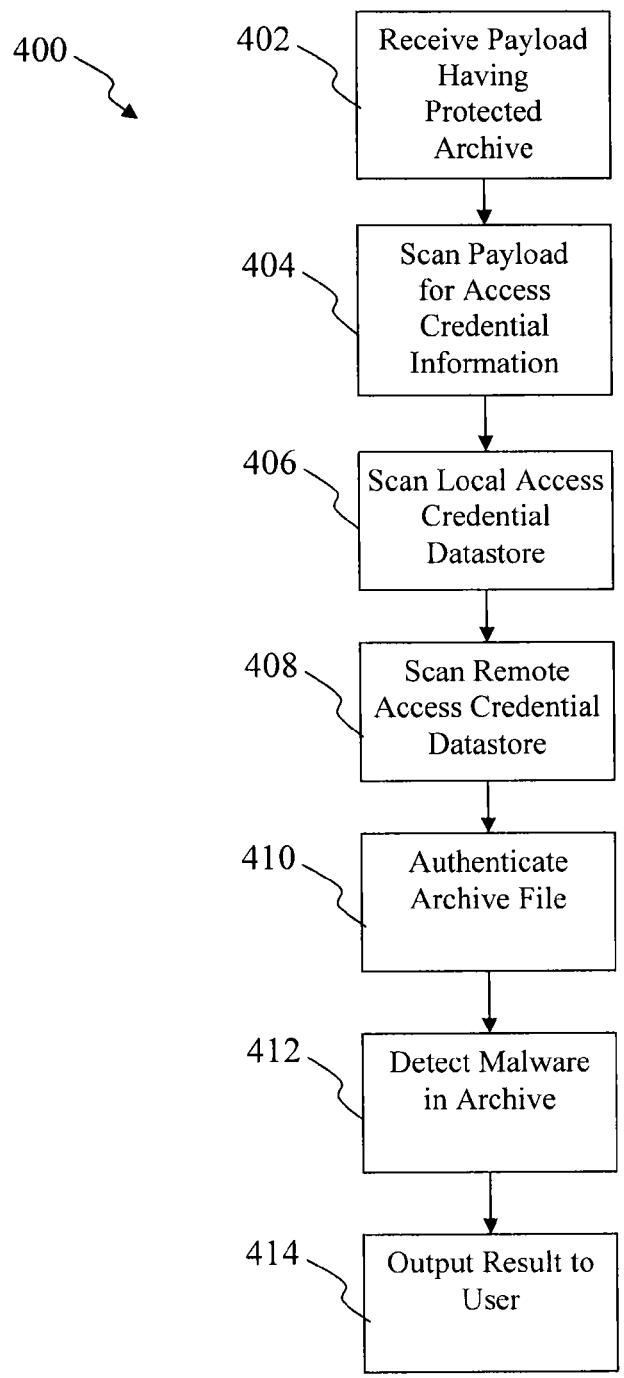
FIG. 4 is a flow chart representing the process of executing the instructions directed to opening a protected archive according to one embodiment.

Now referring to FIG. 4, a process of analyzing a protected archive 400 according to one embodiment is depicted. In this embodiment in process block 402 the computer receives an access credential protected archive or other item of data as part of a message, file transfer or other delivery payload. The protected archive may be an attachment in an e-mail, transfer via instant messenger or other means of electronic communication. In other embodiments, the access credential protected archive may be transferred via tangible medium such as compact disc (CD), hard disk or other memory format. In process block 404 the computer processor or system will scan the message payload for access credential information contained within the payload. The protected archive is identified as such based on a variety of criteria according to various embodiments. For example, in one such embodiment, metadata in the archive is used to identify the type of archive and if it is protected. In another embodiment, a protected archive may be identified by default if the data item cannot otherwise be identified as being of a known data type.

The access credential information may be stored in a text file, image file, or other format viewable by the user and providing the related access credential information. The scan may utilize a variety of criteria for detecting access credential information such as, for example, keywords such as "password", "key", "passcode", "passkey", "passphrase", "ID", "PIN", "access", "code", "protect", "encrypt", "decrypt", "parole", "ticket", "countersign", "secret", or similar, in identifying access credential information. In a related embodiment, a measure of proximity to the set of keywords is to be employed (e.g., a proximate determination may be made if the protected archive and the password information is received within a certain time window; alternatively, or in addition, the proximity measure can be based on their proximity in the file system directory.

In the event that the system cannot find access credential information, the system can scan the local access credential data store for information relating to the protected archive in process block 406. The scan may use metadata associated with the protected archive such as file size, file name, file header information, file type or other identifying information in an attempt to retrieve access credential information from the data store. In the event that the local access credential data store does not contain access credential information relating to the protected archive, the system can be configured to scan a remote access credential data store depicted in process block 408. The remote access credential data store may reside in a remote, network accessible computer or server system such as an application server or database server. In various embodiments, the system will utilize a web service, HTTP request, email or other networked messaging format to communicate with the remote access credential data store.

The communications may be encrypted locally using an encryption mechanism such as a cryptographic hash function, block cipher or public-key cryptography before transmission. In certain embodiments, the remote access credential data store may decrypt the message and utilize the received information to search for access credential information. In other embodiments the communication channel with the remote access credential data store is secured by utilizing SSL, TLS, HTTPS or other secure communication protocol. Further, the remote access credential data store may have a public or communal portion for the sharing of access credential information and a private portion that may be utilized to provide remote backup and access of access credential information. Once the access credential information is determined, the system will access the protected archive, and extract the information contained therein in process block 410. As mentioned above, protected archive may be in a compressed format such as that which is typically stored with file extensions .zip, .rar, .gzip or other compression formats. The extracted information may then be examined for malicious content in process block 412. In various embodiments, the extraction of process block 410 and detection of process block 412 are performed within a protected area of memory or "sandbox". Any detected malicious code is thus prevented from proliferation and contained within a defined memory space. In process block 414, information relating to the contents of the protected archive and the determination of maliciousness is communicated to the user. The communication may take the form of a graphic, sound byte, movie or combination in order to fully represent the result of the process. In various embodiments, the process allows the user to communicate the results of the process blocks, including extracted data and maliciousness determination, to the remote access credential data store. In the case that the user selects transmission to the remote data store, additional metadata relating to the received protected archive and detected malicious content is compiled and communicated to the remote data store. The remote data store will then store the information and related metadata for later retrieval. In this way, the user may supply the community with information relating to the protected archive containing malicious content. Other users that receive the same protected archive may utilize the information sent to the remote data store to bypass the access credential and detection process blocks. In various embodiments, the local and remote access credential data stores may be MySQL®, PostgreSQL®, Oracle®, MSSQL®, or other relational databases having tables for storing and associating the access credential information with the protected archive. Thus, the system described in FIG. 4, maybe used to provide a more efficient and robust system of protection from malicious code stored in protected archives.

Figure 5:
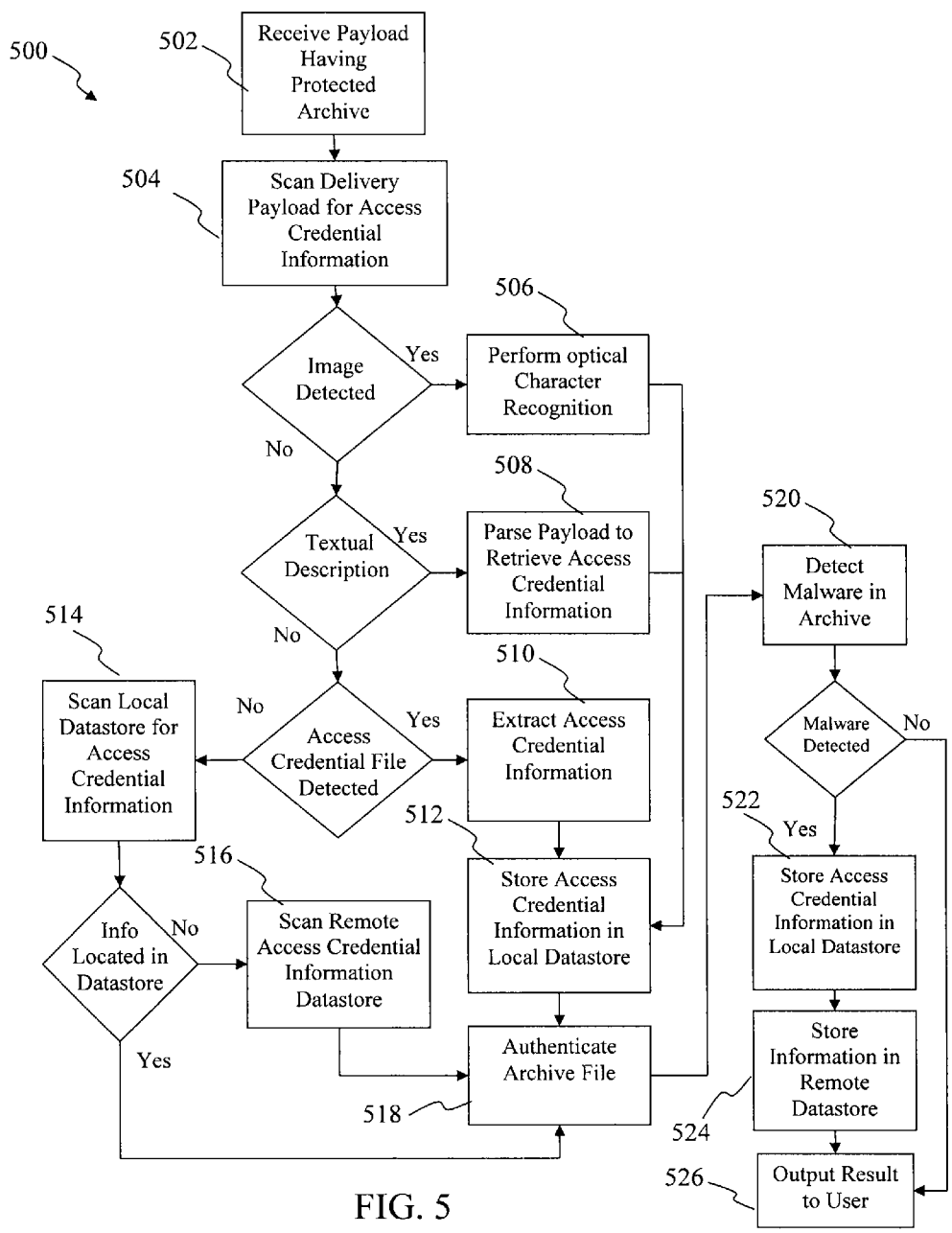
FIG. 5 is a flow chart representing the process of executing the instructions directed to opening a protected archive according to another embodiment.

Now referring to FIG. 5, another embodiment of a process of analyzing a protected archive 500 is presented. In process block 502, a protected archive is received on a user's computer and scanned 504 for access credential information. If an image is detected, optical character recognition will be performed 506, in an effort to determine the access credential information stored therein. As mentioned above, the image may be a type that is typically stored with a file extension of .jpg, .png, .tiff, .gif or other image format. The optical character recognition performed in step 506, may utilize various algorithms known in the art that operate to decipher the characters utilized in an image enabling their capture for use in additional processes. If no images are detected, the payload will be analyzed for presence of a textual description. If a textual description exists then it is scanned, parsed or otherwise analyzed, in an effort to obtain access credential information in process block 508. In various embodiments, keywords such as "username", "password", "license", "terms of use" or other such keywords relating to access credential will be used to locate potential access credential information located within a textual description. If no textual description exists, the process will then scan for an access credential file. The scanning may include searching the payload for file attachments having file names including terms such as "Pswd*", "*Key*", "Pass*" and variations thereon. If an access credential file is detected, the access credential information is extracted from the access credential file by parsing the file for keywords such as "username", "password" or other such terms relating to access credential in process block 510. The access credential file may be an ASCII file such as a file stored with a file extension .txt, .doc, .docx, .xml, .html, .nfo or other ASCII document format which can be readily parsed for keywords identifying access credential information including "password", "key", "pass". In process block 512, the recognized, parsed, or extracted access credential information is stored in a local access credential information data store for future use. The local data store may be a database, hash file or other data store capable of storing information for later extraction and use. For example, the local access credential data store may be a MySQL®, PostgreSQL®, Oracle®, MSSQL®, or other relational database having tables for storing and associating the access credential information with the protected archive.

In the event that access credential information is not stored in an image, textual description, or access credential file, the local access credential information data store will be scanned for access credential information in process block 514. As mentioned above, the local data store scan may utilize metadata relating to the protected archive in an effort to find the stored access credential information. If the information is not located in the local data store, the remote access credential information data store will be scanned in process block 516. The remote scan may utilize metadata relating to the received protected archive as keywords in the scan. The remote access credential data store may reside in a remote, network accessible computer or server system such as an application server or database server and may contain a MySQL®, PostgreSQL®, Oracle®, MSSQL®, or other relational database having tables for storing and associating access credential information with protected archives. In various embodiments, the system will utilize a web service, HTTP request, email or other networked messaging format to communicate with the remote access credential data store. The metadata may be encrypted utilizing a hash cipher, block cipher, public-key encryption or other method of cryptography, before transmittal. By encrypting the metadata information before transmittal, the information is protected from manipulation while being transferred the remote access credential data store. In certain embodiments, the remote access credential data store may decrypt the message and utilize the received information to search for access credential information. In other embodiments the communication channel with the remote data store is secured by utilizing SSL, TLS, HTTPS or other secure communication protocol. Further, the remote access credential data store may have a public or communal portion for the sharing of access credential information and a private portion that may be utilized to provide remote backup and access of access credential information. In the event that access credential information is determined, the protected archive file is authenticated and contained information extracted in process block 518. The data contained in the protected archive may be executable files, data files, databases, or other forms of data storage. In process block 520, the extracted information is scanned for malicious content detecting any malware. That malicious content may be detected by various antivirus programs known in the art such as antivirus programs from Kaspersky®, McAfee®, Symantec® and others. If malware is detected, the user may be prompted to store the information relating to the protected archive in the local access credential data store in process block 522 and remote access credential information data store in process block 524. In process block 526, the summary result of the payload is presented to the user. If no malware is detected, the result is shown to the user and the information in the protected archive may be utilized for its intended purpose.

In various embodiments, the process of analyzing a protected archive 500, may utilize plugins or functional modifications of programs in order to assist in the detection of protected archives and access credential information. For instance, the process of analyzing a protected archive 500 may utilize a Microsoft Outlook plugin in order to continually monitor incoming email messages for protected archives and to implement payload scanning Additionally, the process may utilize a Unix, Microsoft Windows®, Linux® or other operating system background service to implement the scans. In this way, the protected archive analysis may operate as a continually monitoring background service, system load process, or scheduled process.

FIGS. 6A and 6B depict information payloads according to various embodiments of the invention. FIG. 6A depicts a payload containing several protected archives compressed utilizing the Roshal Archive (RAR) format and an ASCII-format access credential information file. In various embodiments, the system described in FIG. 5 above, would analyze the payload and attempt to extract the access credential information from the access credential information file. First, the message payload is scanned to determine whether there are any image files, textual descriptions or access credential files in the playload. In the embodiment presented by FIG. 6A, the scan detects an access credential file after searching the playload utiluzuing a keyword such as "*Pass*", "*key*", or the like. Second, the access credential information is extracted from the access credential file "Password.txt" and is utilized in an attempt to authenticate or gain access to the data stored within the protected archives Archive1.rar, Archive2.rar and Archive3.rar. In an associated embodiment, the system may store the access credential information in a local or remote data store for future use. Third, the contents of the authenticated Archive1.rar, Archive2.rar and Archive3.rar archives are scanned for viruses, malware or other harmful programs. Fourth, if malware is not detected, the system may present the contents of the protected archives to the user, store them in a memory or allow for other user interaction with the protected archive contents. If malware is detected, the system may store the access credential in a local datastore, a remote datastore, or both and may place the protected archive files in a secure memory location, place protected archives in a protected storage space known generally as a "sandbox", delete the protected archives or take other steps to ensure the protected archives containing malware or other harmful programs do not have access to the user's computer.

Figure 7:
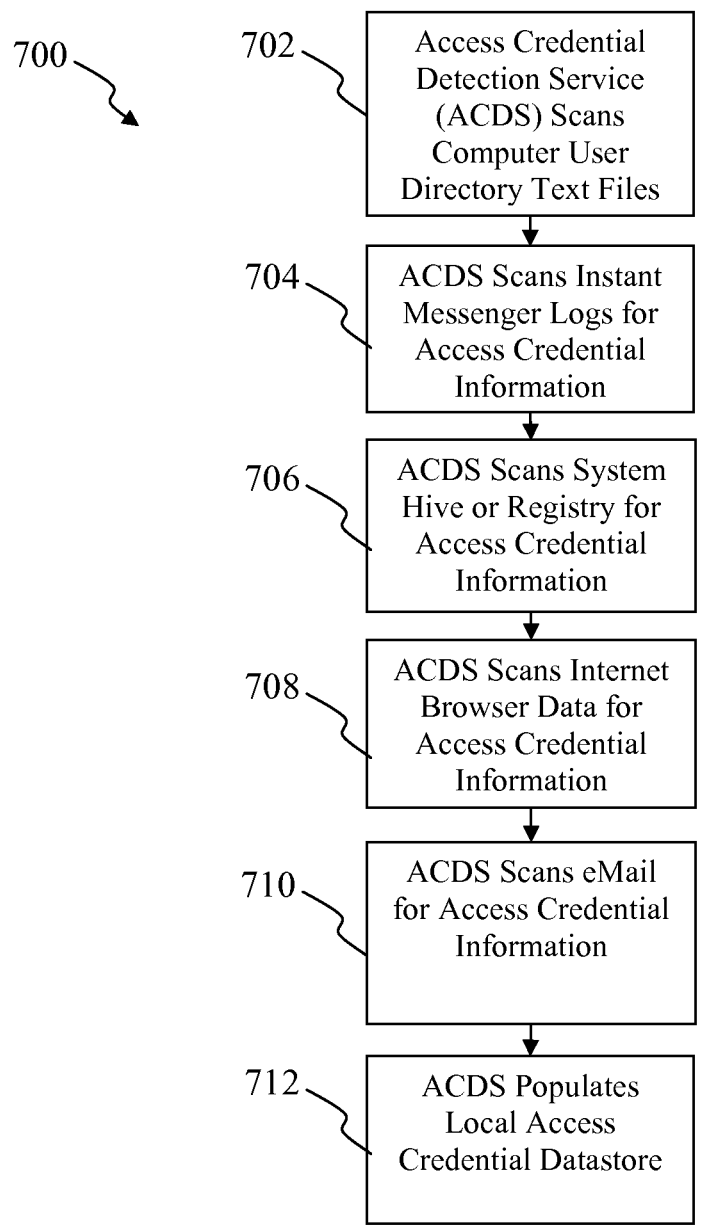
FIG. 7 is a flow chart representing the process of scanning for existing access credential information in a memory according to one embodiment.

FIG. 6B depicts a payload containing an image having access credential information embedded therein. In one embodiment, the system described in FIG. 5 above analyzes the payload and attempt to extract the access credential information from the image file. The system can execute in a manner similar to that described above for FIG. 6A; however, in scanning the payload, an image file would be detected. This image file would then be passed through an OCR program in an attempt to extract the access credential information. After OCR, the system may store the access credential information in a local or remote data store for future use. The access credential information extracted from the image may then be utilized in an attempt to authenticate or gain access to, and subsequently scan, the data stored within any protected archives in the payload associated with the image file for malware. Now referring to FIG. 7, the password detection service according to one embodiment is depicted. The process 700, according to one embodiment, initializes access credential detection service (ACDS) that scans local memory for access credential information stored in a variety of ASCII and non-ASCII files. Local memory may include hard drives, RAM, ROM, USB drives, memory sticks, or other hardware capable of storing information. ASCII file formats may include .txt, .doc, .docx, .xml, .html or other ASCII document formats. The scanning may include searching the ASCII files for keywords such as "username", "password", "license", "terms of use" or other keywords that relate to access credential. Other embodiments utilize file name searches and key filename terms such as "Pswd*", "*Key*", "*Pass*" and variations thereon. Further, in various embodiments, the ACDS examines the special organization of the characters in an attempt to retain password information. Thus, if a user has a username and password stored in a text file separated by a newline character, without any other identifying information, the ACDS may scan that file and based on the organization of the text and newline characters may determine that the information is used for access credential. Non-ASCII file formats include graphical images typically stored in the file system using file extensions .jpg, .TIFF, .gif, .png and other file formats including those typically stored with the PDF, .PS, and .PSD file extensions. In process block 702, the ACDS scans ASCII files in user directories for access credential information. User directories may include, for example, a "My Documents" folder, a root directory or other directory associated with or accessible by a user. The user directory may be located on a local internal memory, or may be in a remotely networked memory, or attached memory such as a removable hard disk. Next, the ACDS scans instant messenger logs for access credential information 704. Instant message logs may be associated with various instant message programs services such as Yahoo Messenger®, Google Talk®, Adium®, Pidgin®, Microsoft Messenger®, ICQ® or other instant messaging clients capable of storing instant message transcripts. In process block 706, the ACDS scans the system registry or system configuration file folders for access credential information. In various embodiments, the ACDS will not alter the registry or configuration files but only access them in a read-only state so as not to affect the normal function of the computer system. The scan may utilize keywords such as "username", "password", "license", "key" or other variations in order to locate access credential information. In process block 708, the ACDS scans Internet browser data for access credential information. The Internet browser data may include cookies, internet history, browser password stores, cached images, or other internet browser data captured in the local memory during use of the browser. In process block 710, the ACDS scans email data stores and email archives for access credential information. For example, the ACDS may scan a .PST file created by Microsoft Outlook for access credential information. The scan may include an examination of the message body as well as email attachments including graphical images, ASCII files, protected archives and other email attachments storing data. In the event that the email scan in process block 710 detects an email with attachment, the ACDS will attempt to scan the attachment for access credential information. In process block 712, the ACDS creates and populates or updates a local access credential data store which can be later queried for access credential information. As in other embodiments, the local access credential data store may be a MySQL®, PostgreSQL®, Oracle®, MSSQL®, or other relational database having tables for storing and associating the extracted access credential information with the appropriate services, files and archives. In this way, the ACDS is able to analyze the complete access credential profile of a user, retroactively, and locate all of a user's access credential information that is stored on a memory.

The ACDS may also utilize plugins or functional modifications of programs in order to detect access credential information. For instance, the ACDS may utilize a Microsoft Outlook plugin in order to continually monitor incoming email messages for access credential information or a Mozilla Firefox® plugin to monitor web browsing. Additionally, the ACDS may utilize a Unix, Microsoft Windows®, Linux® or other operating system background service to implement the scans. In this way, the ACDS may operate as a continually monitoring background service, system load process, or scheduled process. Thus, in various embodiments, the ACDS continually monitors a user's access credential profile.

In various embodiments, the access credential information retrieved during the ACDS scan may be retrieved by a user for use of the associated networks or local services. For example, if a user has purchased something from Amazon.com in the past, but cannot remember their access credential information, the user may query or scan the ACDS for the access credential information associated with Amazon.com. Similarly, if a user has forgotten their debit card pin number and had stored it in a text file on the computer system, the user may now query the ACDS data store for the pin.

In order to attempt to determine the associated local or networked services associated with access credential information existing on a system, the ACDS may retain metadata related to where the information was found on the system in order to provide context to the access credential information. In various embodiments, the user may view and alter the captured metadata in order to assist in the management of the information. For example, a user may associate a service with access credential information stored within the ACDS data store via a user interface. Thus, by executing the ACDS, a computer user with a long history of creating and utilizing access credential information in various networked or local services may have all historical access credential information stored in one central location.

In various embodiments, the ACDS data store is stored remotely in order to facilitate portability of the access credential information. Additionally, the remote storage of access credential information allows for alternative modes of access. For instance, when a user utilizes his own personal computer, local software may be utilized to access the remote ACDS data store. When the user utilizes a computing device that is not owned or operated by the user, or one which the user has limited feature access, the ACDS data store may utilize a web-enabled interface to ensure access to the access credential information. Further, the remote ACDS data store affords additional security to users who have several distinct persons interacting on a single device. For instance, when utilizing a computing device that several users have access to, the remote ACDS data store allows each user to store their access credentials in a secure location that cannot be accessed by the other users of the device.

In various embodiments, the system will utilize a web service, HTTP request, email or other networked messaging format to communicate with the remote ACDS data store. The data may be encrypted utilizing a hash cipher, block cipher, public-key encryption or other method of cryptography, before transmittal. By encrypting the data information before transmittal, the information is protected from manipulation while being transferred the remote access credential data store. In other embodiments the communication channel with the remote ACDS data store is secured by utilizing SSL, TLS, HTTPS or other secure communication protocol.

Figure 8:
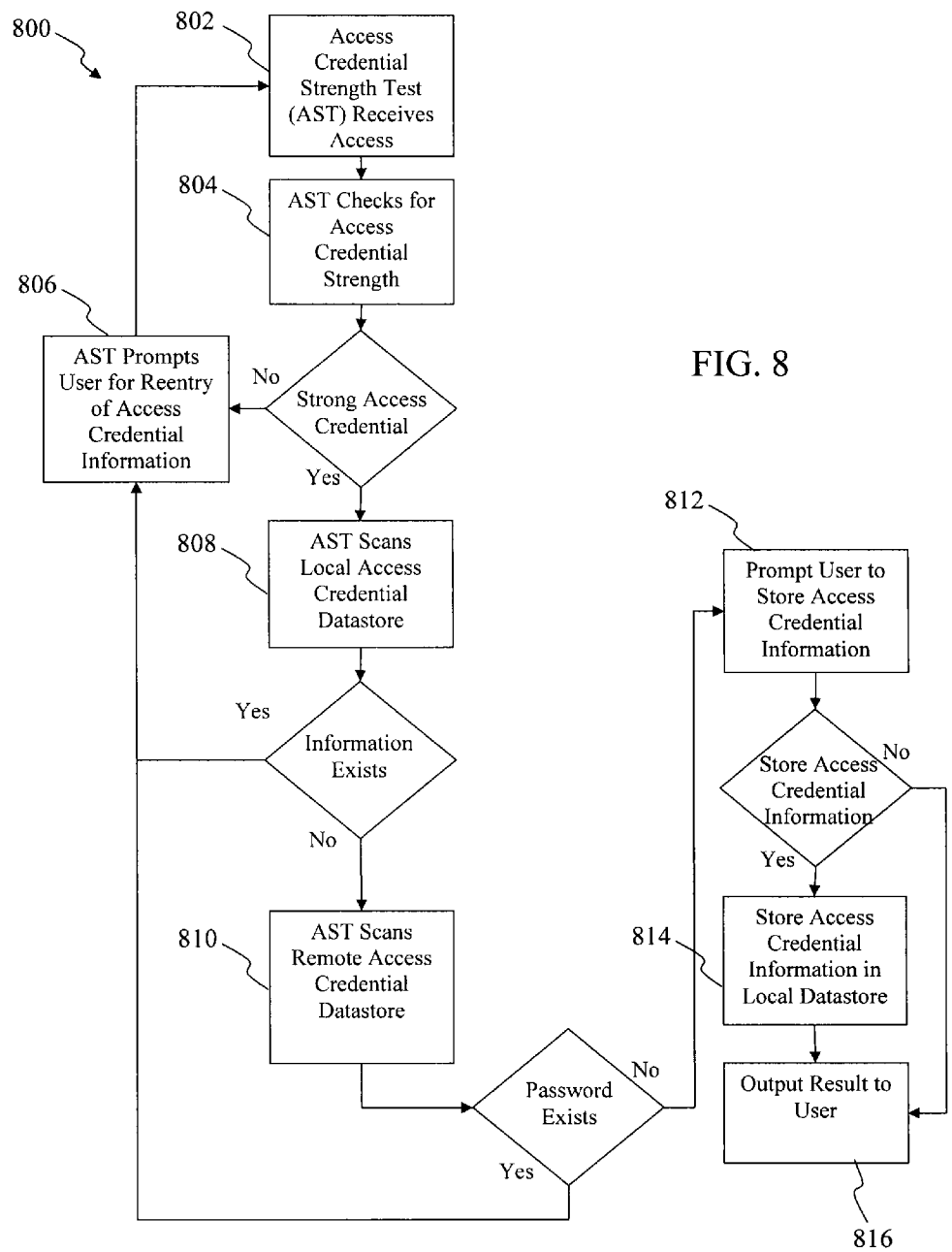
FIG. 8 is a flow chart representing the process of determining the strength of access credential information utilizing local and remote information according to one embodiment.

FIG. 8 is a depiction of a process of determining the strength of access credential credentials according to one embodiment. The access credential strength test (AST) is a process 800 that determines the strength of access credential. Access credential information that is strong, consists of random character combinations, has not been utilized by the user in more than one instance and has not been compromised by malicious programs. The AST begins by receiving potential access credential information from the user 802. In various embodiments the user enters access credential information into a textbox or other application interface element presented to the user for input purposes. In process block 804, the AST checks the user entered access credential information strength utilizing various algorithms. For example, process block 804 will parse the access credential information and determine the letter, case, repeat and consecutive count of all letter characters. Further, the sequential nature of any numbers will be determined along with overall count, repeat and consecutive number count. Access credential information will be designated strong if criteria relating to the length, case, non-consecutive, non-sequential and lack of repeat character requirements are met. For example, a password that contains all-lowercase letters such as "rufus" would not be considered a strong password, while a password with lowercase and uppercase letters along with numbers and punctuation would be considered strong ("qU8b2Di!E$"). In the event that the access credential information is determined to not meet the threshold requirements of a strong determination, the AST will prompt the user to enter in new access credential information in process block 806. If the access credential information is considered strong, the AST will then check the information against the local access credential data store in process block 808. The local access credential data store may be a MySQL®, PostgreSQL®, Oracle®, MSSQL®, or other relational database having tables for storing and associating access credential information. If the access credential information already exists in the data store, this means the user has utilized the access credential information in some other service. The reuse of access credential information is a potential security issue as if a malicious program obtains a user's access credential information and that information is utilized in several programs and services, then the malicious program may be able to infiltrate those services and transact, obtain and modify information or otherwise propagate across the services it has access to. Thus, if the access credential information is found, the AST may prompt the user to enter new access credential information at 806 in order to reduce or eliminate the potential of malicious propagation, data theft and alteration. If the access credential information is not found in the local data store, the AST will scan a remote access credential data store to determine whether the access credential information has been utilized or has been compromised by known malicious programs in process block 810. For example, if a user on another system was infected with the Antigen Trojan and the password information stolen was later recovered, it may be uploaded to the remote access credential data store. In this situation, process block 810 would flag the user submitted access credential information as compromised and prompt the user to enter in new access credential information in process block 806. Further, the remote access credential data store may contain common password strings utilized in many brute-force and dictionary-type attacks utilized by access credential hacking programs. Thus, the remote data store may include passwords such as "QWERTY", "1234" and other frequently utilized, "weak" or otherwise compromised passwords. If the access credential information is determined to be compromised, the AST will prompt the user to reenter access credential information at 806. If the access credential information has not been compromised, frequently used or weak, the user may be prompted to store the access credential information in process block 812. If the user chooses to store the information, process block 814 will store the access credential information in the local access credential data store. Further, the access credential information may be optionally associated with a specific service or program for later retrieval by the user. For example, if the user utilized the AST to determine the strength of access credential information potentially utilized for eBay.com, they can store the access credential information with additional metadata describing the eBay.com service. In this way, the process 800 may check for the strength of access credential information and store additional access credential information in order to facilitate further access credential management services such as auto-insert of credentials when associated service is utilized, password change reminders, and password use counts. The result of the AST is displayed to the user in process block 816. The information presented to the user will change depending on whether the user decided to store the access credential information, associate the information with a specific program or service, or forgo storage altogether. Further, the information displayed to the user may include access credential usage statistics, number of days since last update, number of services utilizing the same access credential and other credential metrics.

Figure 9:
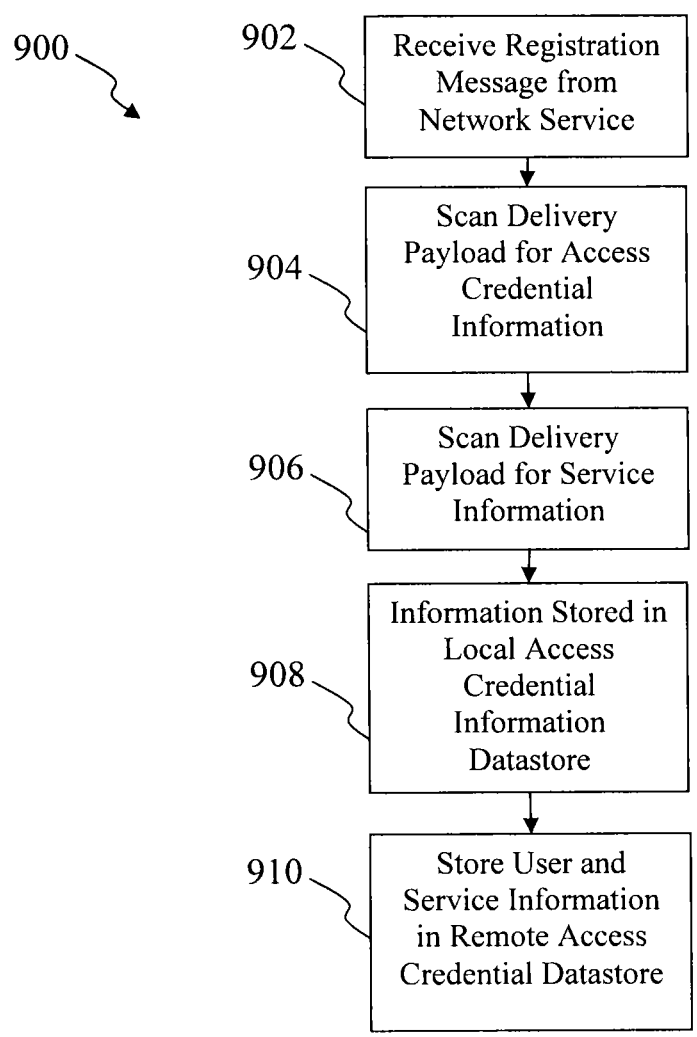
FIG. 9 is a flow chart representing the process of adding received access credential information to a memory according to one embodiment.

In establishing access to a new network enabled service, a user will often be required to create a user account having a username, password, email address, phone number or other such access credential and personably identifiable information. Once this information is submitted, the service administrator will often generate a confirmation message which is then delivered to the user. In many situations the user may then validate the receipt of the message and begin utilizing the service. FIG. 9 is a depiction of the process 900 of automatic detection and association of such access credential information according to one embodiment. In process block 902, a registration message is received from a network enabled service. The registration information may be encapsulated within an email, Instant Messenger chat, Short Message Service (SMS), Multimedia Messaging Service (MMS) or other form of digital communication. In process block 904, the registration message is scanned for access credential information. The access credential information may include a username and password that was entered by the user when registering for a service. The scan may utilize keywords such as "username" and "password" and variations thereon to quickly identify access credential information. In process block 906, the registration message is scanned for information relating to the service. For example, if the user registered for a user account on Wordpress.com, the registration message may include a reference to "Wordpress.com" in the message body either as a textual description or as a hyperlink. If the message was delivered to the user via email, the email may include information in the message header, such as the "from" designator, having a suffix such as "@wordpress.com". Thus, similar to the scan for access credential information, the service search may utilize process block 906 may utilize keywords or characters such as "@", ".com", ".net", ".edu" and others to search for service information. In process block 908, the access credential information and the service information is stored in the local access credential information data store. In the process of storing the information, the access credential records and the service information is linked, in order to enable users to later utilize the access credential information data store to retrieve access credential information. In process block 910, the access credential information and the service information is stored in a remote access credential information data store. In various embodiments, the system will utilize a web service, HTTP request, email or other networked messaging format to communicate with the remote access credential data store. The data may be encrypted utilizing a hash cipher, block cipher, public-key encryption or other method of cryptography, before transmittal. By encrypting the data information before transmittal, the information is protected from manipulation while being transferred the remote access credential data store. In other embodiments the communication channel with the remote data store is secured by utilizing SSL, TLS, HTTPS or other secure communication protocol. Thus, the process of automatic detection and association of access credential information operates to capture and store access credential and service information in a central location for later retrieval.

In a select embodiment, the system of automatic detection and association of access credential information includes the ability to capture and analyze images relating to access credentials. For example, if a user creates a bank account that utilizes mutual-access credentials to authenticate the users and the service provider that includes an image, the system may capture the image information and store it in the data store along with the other access credential information for later retrieval. In this embodiment, the image capture and analysis feature may be provided by an internet browser plugin or via a small desktop application capable of analyzing network communication along with the information rendered on the screen. For example, the user may download a plugin for Mozilla Firefox® that allows the browser to capture information relating to the image utilized in mutual-access credential. The plugin may capture the image and associated username, password and URL information and store it in the access credential information data store. For example, if a user opened an account with a service which utilizes a mutual-security program such as SiteKey from RSA Data Security® that allows the user to select an image that is displayed by the service prior to a user entering in a password, the system could capture the user selected image along with username, password and URL and store it in the local access credential information database. Later, upon return to the service website, the system could examine the URL and displayed image to determine the authenticity of the website and associated service. The image analysis could be performed by utilizing an object character recognition program, hash comparison, or other image analysis software capable of comparing digital images. The system could then query the access credential information data store for the username and password information associated with the service. In this way, the system provides the user not only access credential management support, in assisting in the retrieval of access credential information, but also assists in the identification of security threats by identifying URL and image combinations incompatible with the associated service. Thus, various embodiments of the system are able to detect and neutralize malicious attacks that utilize Phishing or man-in-the-middle schemes in an attempt to obtain sensitive information.

Further, in a select embodiment, the system compiles information relating to access credentials including but not limited to usage and age. For example, the system may provide the user information relating to the most frequently used access credentials on their system. In another embodiment, the system may provide the user with a summary of the age of the access credential information stored in the data store. Further, the system may provide suggestions to the user as to which access credentials need to be retired, updated or otherwise altered in order to maintain good security practices. The system may provide a cross-reference of access credential information and associated metadata providing related service information to list of the most frequently maliciously attacked services. In this way, the system may provide the user with a statistical analysis of their access credentials and an up-to-date analysis of risk.

In a related embodiment, the system may provide the user a potential "infiltration" map to assist the user in identifying services that are utilizing the same access credentials. The system would first analyze the local access credential data store to obtain a list of access credentials and their related services. The system would then compile a list of the services utilizing the same access credentials for display to the user. The system would then present these services to the user utilizing an interactive graphical representation. The graphical representation may be 2D or 3D and may utilize image formats such as those typically stored with file extensions .png, .jpg, .gif, and may utilize content represented by code typically stored using the file extensions .html, .xml, .xhtml, Adobe Flash® or Microsoft Silverlight®. The graphical representation may present the services to the user in an interconnected web, a grid, a sphere, a data tree, cloud, Venn diagram or other representation capable of visualizing the relationship between data points. The interactive graphical representation may provide functionality to the user for access credential management including password changes, password change reminders, use alerts, service grouping and the like. For example, the user could "hover" over a portion of the graphical representation representing a service utilizing a user input device and obtain a "pop-up" or "hover" menu which would allow the user to, for example, update the access credentials in the local data store and the remote service site.

In another embodiment, the system may provide the user with a "security score" that provides an indication to the user of their security level. The security score would be an metric related to the user's implementation of security best-practices including installation and maintenance of an antivirus software program, a firewall software program, an anti-phishing program, distinct access credential maintenance and others. A high security score would indicate to the user that they have taken the appropriate measures to ensure security of their computer system and maintain a good security profile with local and network software. A low security score would indicate a lack implemented security measures, use of compromised access credentials, use of same or similar access credentials for several services, extended period since last access credential update and other insecure practices. In certain embodiments, the system accepts data warning s from local and network services. These data warnings would indicate a potential or realized security breach of the service. In this situation, the service may scan the access credential data store for the service that issued the data warning and other services that utilize the same access credentials. For example, if Amazon.com's service was compromised and access credentials for user accounts stored on their server were accessed, Amazon.com may send a data warning. The system would then locate Amazon.com's entry in the local access credential database and all other services utilizing the same access credentials, for example, SmugMug® and Flickr®. The system may then update the security score to reflect the potential security threat, reducing the score due to the data warning and the three potentially effected services. Further, the system may provide warnings and suggestions to the user regarding actions to take to ensure security. In various embodiments, the system may automatically update the affected passwords in the local access credential data store and in the local or remote service. The system may update the remote service access credentials utilizing a web service, secure email or other secure transmission. Further, the local access credential data store may be synchronized with a remote access credential data store to enable a user to access their access credentials from alternative locations and maintain a safe backup of the sensitive information. Thus, the system thus may provide the user with security maintenance and management tailored to the user's actual usage patterns.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A machine-implemented process for screening data for malware, the process being performed by a computer system having processing circuitry operatively coupled to at least one data store, the process comprising:
    storing received data in the at least one data store, wherein the received data includes at least: (i) a first and a second protected item of data, each containing contents that are inaccessible without corresponding access credential information, and (ii) first access credential information corresponding to the first protected item of data, the first access credential information having been received separately from the first protected item of data;
    storing other access credential information in the at least one data store, the other access credential information including at least second access credential information corresponding to the second protected item of data;
    analyzing the received data to detect the first protected item of data therein based on predetermined protected data item identification criteria;
    analyzing the received data to detect the first access credential information contained therein based on predetermined access credential identification criteria that includes application of a measure of proximity between information items contained in separately-received portions of the received data and detected protected items of data in the received data;
    in response to a detection of the first access credential information in the at least one data store, storing the first access credential information in the at least one data store in a grouping arrangement with the other access credential information;
    in response to a detection of at least one of the first and the second protected item of data, using the corresponding access credential information stored in the grouping arrangement, including the first access credential information and the second access credential information, to facilitate access to the first and the second protected items of data by a malware screening process to extract content from the first and the second protected items of data; and
    executing the malware screening process to scan the content extracted from the first and the second protected items of data to detect a presence of malware.

2. The process of claim 1, wherein analyzing the received data to detect any access credential information contained therein based on predetermined access credential identification criteria does not take into account any predefined association of the access credential information with any protected item of data.

3. The process of claim 1, further comprising:
    preventing direct user access to the contents of the first protected item of data until successful completion of the malware screening process.

4. The process of claim 1, wherein the grouping arrangement includes at least one data structure in which grouped items of access credential information are stored.

5. The process of claim 1, wherein the grouping arrangement includes at least one index identifying locations in the data store where grouped items of access credential information are stored.

6. The process of claim 1, wherein storing the first access credential information in a grouping arrangement with the other access credential information includes storing the first access credential information grouped with user-provided access credential information for a variety of different programs or services in a secure arrangement of at least one data structure.

7. The process of claim 1, wherein storing the first access credential information in a grouping arrangement with the other access credential information includes storing the first access credential information grouped with community-provided access credential information compiled from a plurality of different computer systems.

8. The process of claim 1, wherein storing the first access credential information in a grouping arrangement with the other access credential information includes storing the first access credential information with the first protected item of data.

9. The process of claim 8, wherein associating of the first access credential information with the first protected item of data is based on an information organizational proximity between where the first access credential information is stored in relation to the first protected item of data.

10. The process of claim 1, wherein:
    the first protected item of data is received as part of a first message and the second protected item of data is received as part of a second message; and
    the second access credential information corresponding to the second protected item of data, is received as part of a third message separately from the second message.

11. The process of claim 1, wherein storing received data in the at least one data store includes storing the first protected item of data and the first access credential information as part of an email inbox.

12. The process of claim 1, further comprising:
    scanning at least a major portion of the at least one data store to detect any access credential information contained therein based on the predetermined access credential identification criteria; and
    in response to a detection of any new item of access credential information during that scanning, updating the grouping arrangement to add that new item.

13. The process of claim 1, wherein in the access credential identification criteria the measure of proximity is a temporal measure of proximity representing a time window during which items of information contained within the received data are separately received.

14. The process of claim 1, wherein in the access credential identification criteria the measure of proximity represents a relative proximity of storage locations of separately-received items of information from the received data in the data store.

15. Apparatus for screening data for malware comprising:
a computer system having processing circuitry operatively coupled to at least one data store, the computer system being configured to:
- store received data in the at least one data store, wherein the received data includes at least: (i) a first and a second protected item of data, each containing contents that are inaccessible without corresponding access credential information, and (ii) first access credential information corresponding to the first protected item of data, the first access credential information having been received separately from the first protected item of data;
- store other access credential information in the at least one data store, the other access credential information including at least second access credential information corresponding to the second protected item of data;
- analyze the received data to detect the first protected item of data therein based on predetermined protected data item identification criteria;
- analyze the received data to detect the first access credential information contained therein based on predetermined access credential identification criteria that includes application of a measure of proximity between information items contained in separately-received portions of the received data and detected protected items of data in the received data;
- in response to a detection of the first access credential information in the at least one data store, store the first access credential information in the at least one data store in a grouping arrangement with other access credential information;
- in response to a detection of at least one of the first and the second protected item of data, use the corresponding access credential information stored in the grouping arrangement, including the first access credential information and the second access credential information, to facilitate access to the first and the second protected items of data by a malware screening process to extract content from the first and the second protected items of data; and
- execute the malware screening process to scan the content extracted from the first and the second protected items of data to detect a presence of malware.

16. The apparatus of claim 15, wherein the grouping arrangement includes at least one data structure in which grouped items of access credential information are stored.

17. The apparatus of claim 15, wherein the grouping arrangement includes at least one index identifying locations in the data store where grouped items of access credential information are stored.

18. The apparatus of claim 15, wherein the access credential information stored in the grouping arrangement is grouped with user-generated access credential information for a variety of different programs or services in a secure arrangement of at least one data structure.

19. The apparatus of claim 15, wherein the first access credential information stored in a grouping arrangement with the other access credential information is associated with the first protected item of data.

20. The apparatus of claim 15, wherein the received data stored in the at least one data store is stored as part of an email inbox, and includes the first protected item of data and the first access credential information.

21. The apparatus of claim 15, wherein the computer system is further configured to:
- scan at least a major portion of the at least one data store to detect any access credential information contained therein based on the predetermined access credential identification criteria; and
- in response to a detection of any new item of access credential information as a result of that scan, update the grouping arrangement to add that new item.

22. The apparatus of claim 15, wherein:
the first protected item of data is received as part of a first message and the second protected item of data is received as part of a second message; and
the second access credential information corresponding to the second protected item of data is received as part of a third message separately from the second message.

23. The apparatus of claim 15, wherein in the access credential identification criteria the measure of proximity is a temporal measure of proximity representing a time window during which items of information contained within the received data are separately received.

24. The apparatus of claim 15, wherein in the access credential identification criteria the measure of proximity represents a relative proximity of storage locations of separately-received items of information from the received data in the data store.

* * * * *